(12) United States Patent
Motoyama et al.

(10) Patent No.: US 9,892,811 B2
(45) Date of Patent: Feb. 13, 2018

(54) OPTICAL DESIGN METHOD FOR X-RAY FOCUSING SYSTEM USING ROTATING MIRROR, AND X-RAY FOCUSING SYSTEM

(71) Applicant: The University of Tokyo, Tokyo (JP)

(72) Inventors: Hiroto Motoyama, Tokyo (JP); Hidekazu Mimura, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 206 days.

(21) Appl. No.: 14/904,494

(22) PCT Filed: Feb. 3, 2014

(86) PCT No.: PCT/JP2014/052395
§ 371 (c)(1),
(2) Date: Jan. 12, 2016

(87) PCT Pub. No.: WO2015/004934
PCT Pub. Date: Jan. 15, 2015

(65) Prior Publication Data
US 2016/0163409 A1    Jun. 9, 2016

(30) Foreign Application Priority Data
Jul. 12, 2013    (JP) .................................. 2013-147116

(51) Int. Cl.
*G03B 27/54* (2006.01)
*G03F 7/20* (2006.01)
(Continued)

(52) U.S. Cl.
CPC .............. *G21K 1/067* (2013.01); *G02B 5/10* (2013.01); *G02B 19/0023* (2013.01); *G21K 2201/064* (2013.01)

(58) Field of Classification Search
CPC ...... G02B 5/10; G02B 19/0042; G02B 7/182; G02B 5/08; H01L 31/0547;
(Continued)

(56) References Cited

U.S. PATENT DOCUMENTS

2010/0096557 A1* 4/2010 Zocchi .................. B82Y 10/00
250/370.09

FOREIGN PATENT DOCUMENTS

JP    H05-224298      9/1993
JP    2001-343511 A1  12/2001
(Continued)

OTHER PUBLICATIONS

W. Chao, et al.; "Real space soft x-ray imaging at 10 nm spatial resolution;" Optics Express; vol. 20; No. 9; Apr. 23, 2012; pp. 9777-9783 (7 Sheets)/p. 4 of specification.
(Continued)

*Primary Examiner* — Don Wong
(74) *Attorney, Agent, or Firm* — Kratz, Quintos & Hanson, LLP

(57) ABSTRACT

An object of the invention is to provide a novel optical design method for an X-ray focusing system capable of collecting all the fluxes, while applying an X-ray of a very small divergence angle to the entire surface of a rotating mirror. The method includes a step of determining the shape of a rotating mirror (3) provided with a reflection surface, the reflection surface being formed by rotating, by one turn around an optical axis (OA), a one-dimensional profile composed of an ellipse or a part of combination of the ellipse and a hyperbolic curve, the ellipse including a downstream focal point (F) serving as a light collecting point of the X-ray focusing system, and including an upstream focal point (F1)
(Continued)

deviated from the optical axis (OA); and a step of determining the shape of a reflection surface of an annular focusing mirror (4).

5 Claims, 7 Drawing Sheets

(51) Int. Cl.
*G21K 1/06* (2006.01)
*G02B 5/10* (2006.01)
*G02B 19/00* (2006.01)

(58) Field of Classification Search
CPC ............. H01L 31/0543; H01L 31/0523; H01L 31/0556; Y02E 10/47; Y02E 10/52
USPC ........ 356/853; 378/70, 72, 145; 250/370.09, 250/492.1
See application file for complete search history.

(56) References Cited

FOREIGN PATENT DOCUMENTS

| | | |
|---|---|---|
| JP | 2012-242165 A1 | 12/2012 |
| JP | 2014-13169 A1 | 1/2014 |

OTHER PUBLICATIONS

H. Mimura, et al.; "Breaking the 10 nm barrier in hard-X-ray focusing;" Nature Physics; vol. 6; Feb. 2010; pp. 122-125 (4 Sheets)/p. 4 of specification.

T. Saito, et al.; "Development of Surface Profile Measurement Method for Ellipsoidal X-Ray Mirrors using Phase Retrieval," Proc. of SPIE; vol. 8501; 2012; pp. 850103-1-850103-8 (8 Sheets)/p. 4 of specification.

International Search Report for International Application No. PCT/JP2014/052395 dated Apr. 1, 2014.

* cited by examiner

OPTICAL DESIGN METHOD FOR X-RAY FOCUSING SYSTEM USING ROTATING MIRROR, AND X-RAY FOCUSING SYSTEM

TECHNICAL FIELD

The present invention relates to an optical design method for an X-ray focusing system using a rotating mirror, and an X-ray focusing system, and more particularly, to an optical design method for an X-ray focusing system capable of collecting all the fluxes of an X-ray of a small divergence angle by using a large aperture rotating mirror, and the X-ray focusing system.

BACKGROUND ART

With use of X-rays in the wavelength range from several nanometers to angstroms, it is possible to observe the structures of materials, electrons, and chemical bonding states, and it is also possible to observe the inside of the materials because X-rays have high transmissivity. X-rays are indispensable light in many fields of advanced science and technology such as material science and life science. In view of the above, research and development of X-ray focusing elements indispensable for high resolution microscopes have been actively carried out. Representative X-ray focusing elements are a zone plate and a KB mirror. Regarding soft X-ray focusing, a soft X-ray microscope using a zone plate and having a resolution of 10 nm has been reported (see Non-Patent Document 1). Further, in the field of hard X-ray focusing, 7 nm-focusing by using a KB mirror has been reported (see Non-Patent Document 2). However, both of the focusing performances of a zone plate and a KB mirror have reached a theoretical limit. There is a demand for a novel focusing element for further improvement of focusing performance.

A zone plate mainly used as an X-ray focusing optical element has low focusing efficiency. In addition to the above, the zone plate is usable only for a single wavelength because the zone plate utilizes a diffraction phenomenon. On the other hand, a reflective rotating mirror is an idealistic focusing element because the reflective rotating mirror has a large aperture, high focusing efficiency, and is free of chromatic aberration. For instance, Patent Document 1 discloses an X-ray focusing element provided with a rotating parabolic reflection surface or a rotating ellipsoidal reflection surface. Patent Document 2 discloses an X-ray device, in which a rotating mirror (a Wolter mirror) configured such that one of the focal points of a rotating ellipsoidal surface and one of the focal points of a rotating hyperbolic surface are made to coincide with each other is used as an X-ray focusing optical system. Nowadays, a process for manufacturing a high-precision rotating mirror incorporated with a variety of unique manufacturing techniques is being developed, and the high-precision rotating mirror will be put into practical use in the near future (see Non-Patent Document 3).

When manufacturing of a high-precision rotating mirror (such as a rotating parabolic mirror, a rotating ellipsoidal mirror, or a Wolter mirror) is completed, a facility in which great advantages are expected to be obtained is a next-generation radiation facility. An X-ray to be output with use of a high-precision rotating mirror has high luminance and is fully coherent. Therefore, it is possible to maximally obtain the performance of the focusing element. Further, it is possible to maximally utilize the performance of the X-ray by collecting the X-ray on a rotating mirror. However, the divergence angle of radiated light is very small, and it is impossible to apply the light to the entire surface of a rotating ellipsoidal mirror 1 having a large aperture. As a result, beams are collected using only a part of illumination (see FIG. 1). In view of the above, there is proposed a technique, in which a beam is expanded by an upstream mirror 2, and is collected by using the entire surface of the rotating ellipsoidal mirror 1. However, it is impossible to collect a beam traveling through the middle portion of the rotating ellipsoidal mirror 1, and the focusing intensity may decrease (see FIG. 2). As described above, in the conventional art, it is difficult to perform nano-focusing and use all the fluxes while utilizing a large numerical aperture when a rotating mirror is used.

CITATION LIST

Patent Literatures

Patent Document 1: JP-A No. 2001-343511
Patent Document 2: JP-A No. 2012-242165

Non-Patent Literature

Non-Patent Document 1: W. Chao, et al. Optics Express Vol. 20, No. 9, (2012)
Non-Patent Document 2: H. Mimura et at Nature Physics, Vol 6, pp. 122-125 (2010)
Non-Patent Document 3: T. Saito Proc. Of SPIE Vol. 8501

SUMMARY OF INVENTION

Technical Problem

In order to improve spatial resolution of an X-ray microscope using radiated light or an X-ray free electron laser, X-ray nano beams are required to have a strong beam intensity so as to enhance the detection limit/detection time. In view of the aforementioned circumstances, in order to eliminate the only disadvantage that the rotating mirror has an annular opening, an object of the invention is to provide a novel optical design method for an X-ray focusing system capable of collecting all the fluxes, while irradiating the entire surface of a rotating mirror with an X-ray of a very small divergence angle, and to provide an X-ray focusing system designed by the optical design method.

Solution to Problem

In order to solve the aforementioned drawback, an aspect of the invention is directed to an optical design method for an X-ray focusing system using a rotating mirror. The optical design method includes a step of determining a shape of a rotating mirror provided with a reflection surface, the reflection surface being formed by rotating, by one turn around an optical axis, a one-dimensional profile composed of an ellipse or a part of combination of the ellipse and a hyperbolic curve, the ellipse including a downstream focal point serving as a light collecting point of the X-ray focusing system, and including an upstream focal point deviated from the optical axis; and a step of determining a shape of a reflection surface of an annular focusing mirror as a group of coordinates of inflection points of beams in inverse ray tracing, the annular focusing mirror having a function of reflecting and expanding an X-ray beam outputted from an X-ray source and collecting the X-ray beam on a light collecting ring under a constrained condition such that the X-ray beam passes through the light collecting ring formed by a locus of the upstream focal point, and that optical path lengths are the same as each other as a result of inverse ray tracing from the light collecting point to the X-ray source.

In the aforementioned configuration, the optical design method may further include a step of determining the shape of the rotating mirror provided with a reflection surface, the reflection surface being formed by rotating, by one turn around an optical axis, a one-dimensional profile composed of a part of an ellipse, the ellipse being configured such that one of focal points of the ellipse serves as the light collecting point of the X-ray focusing system, and that a major axis of the ellipse is rotated by a predetermined angle around an optical axis passing through the light collecting point, wherein a locus of the other of the focal points of the ellipse forms the light collecting ring.

Alternatively, the optical design method may further include a step of determining the shape of the rotating mirror provided with a reflection surface, the reflection surface being formed by rotating the one-dimensional profile by one turn around an optical axis, the one-dimensional profile being formed by rotating a curve profile composed of an ellipse and a hyperbolic curve by a predetermined angle around an optical axis passing through the light collecting point, the curve profile being configured such that one of focal points of the ellipse and one of focal points of the hyperbolic curve are made to coincide with each other, and that the other of the focal points of the hyperbolic curve serves as the light collecting point, the curve profile including a portion at which the ellipse and the hyperbolic curve intersect with each other, wherein a locus of the other of the focal points of the ellipse forms the light collecting ring.

Further, another aspect of the invention provides an X-ray focusing system using a rotating mirror. The X-ray focusing system includes a rotating mirror constituting an oblique incident optical system; and an annular focusing mirror, wherein an X-ray beam outputted from an X-ray source is expanded by the annular focusing mirror and collected in an annular manner, the X-ray beam is reflected on an entire surface of an elliptical portion of the rotating mirror, and all fluxes of the X-ray beam are collected at a light collecting point, the rotating mirror having an elliptical shape or a shape obtained by combining an ellipse and a hyperbolic curve, and the rotating mirror being configured such that a radial profile of a reflection surface in an optical axis direction has, as two focal points, a point on a light collecting ring formed by collecting the X-ray beam on the annular focusing mirror, and the light collecting point of the system.

In the aforementioned configuration, the annular focusing mirror may be an aspherical mirror including a singular point on a center portion corresponding to an optical axis of the X-ray beam outputted from the X-ray source.

Advantageous Effects of Invention

In the optical design method for an X-ray focusing system using a rotating mirror of the invention according to claim 1, and in the X-ray focusing system, a two-step focusing optical system is constituted by an annular focusing mirror and a rotating mirror, and a drawback that the rotating mirror has an annular opening is eliminated. Thus, the X-ray optical system is a theoretically most idealistic focusing optical system for radiated light or for XFEL. No system other than the X-ray focusing system of the invention has been reported as a technique capable of collecting all the fluxes of radiated light of a small divergence angle in a nano-region. Development of next-generation radiation light sources such as XFEL has been carried out all over the world. Further, the next-generation radiation light sources are technically implementable. In view of the above, the next-generation radiation light sources are expected to spread widely as a focusing system of radiated light.

Use of a rotating mirror as a focusing mirror is advantageous because the rotating mirror is free of chromatic aberration, has a large aperture, has a long focal length, is small, and is capable of performing nano-focusing. With use of an annular focusing mirror, an X-ray beam of a very small divergence angle output from an X-ray source is collected in an annular manner, and the collected beam is radially expanded. According to this configuration, there is no beam passing through the middle portion of the rotating mirror, and fundamentally, it is possible to attain 100% beam use efficiency. A beam is collected by two steps, specifically, a beam is collected in an annular manner in the first half stage (a light collecting ring is formed), and then is collected at a focal point in the second half stage. This makes it possible to obtain a high reduction magnification. Thus, it is easy to design an optical system, in which the geometrical size of a focusing beam from a light source is reduced to a value equal to or smaller than the diffraction limit, and it is possible to achieve focusing to the diffraction limit. Applying the focusing system of the invention to a next-generation radiation beam line makes it possible to implement an idealistic X-ray nanobeam of high intensity. This provides breakthrough in the field of X-ray optics.

DESCRIPTION OF EMBODIMENTS

Figure 1:
FIG. 1 is an explanatory diagram illustrating a conventional optical system for focusing an X-ray of a small divergence angle by using a rotating ellipsoidal mirror.
Figure 2:
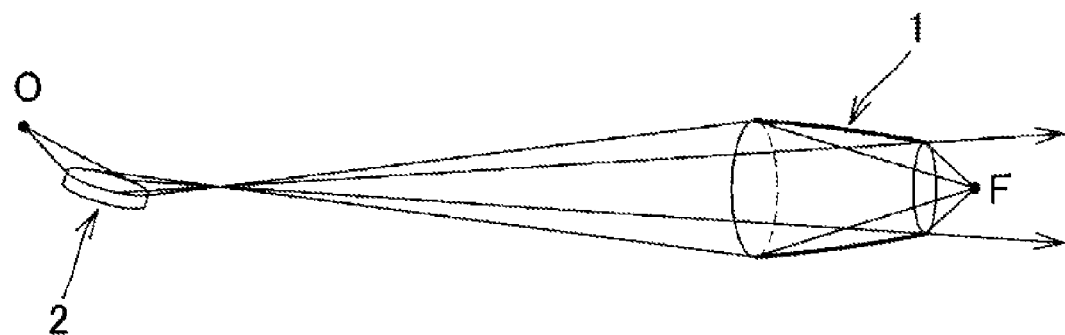
FIG. 2 is an explanatory diagram illustrating a conventional optical system, in which a beam is expanded by an upstream mirror, and then is collected by using the entire surface of a rotating ellipsoidal mirror.
Figure 3:
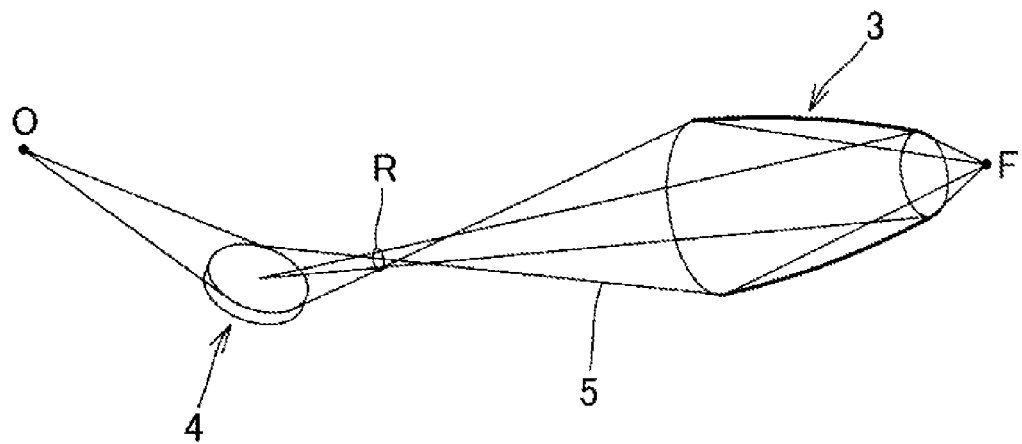
FIG. 3 is an explanatory diagram illustrating an X-ray focusing system of the invention.
Figure 4:
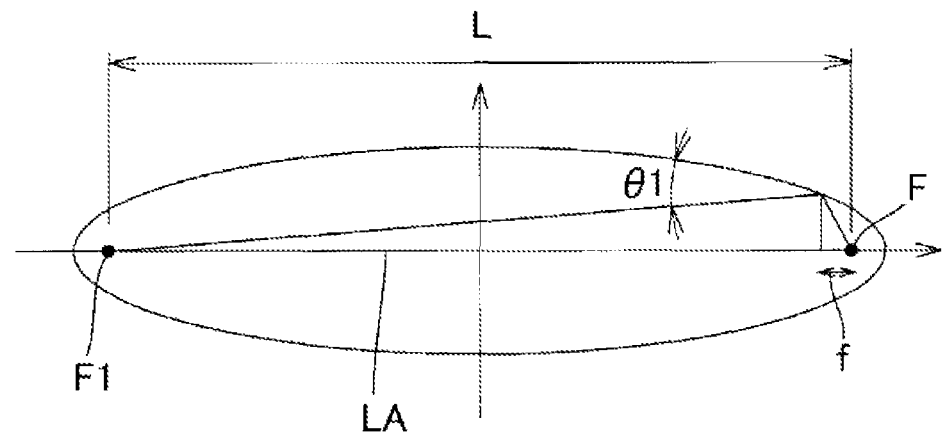
FIG. 4 is an explanatory diagram illustrating an ellipse which determines a reflection surface of a rotating mirror.

Next, the invention is described in details on the basis of an embodiment illustrated in the accompanying drawings. FIG. 1 and FIG. 2 illustrate a conventional X-ray focusing optical system using a rotating ellipsoidal mirror. FIG. 3 illustrates an X-ray focusing system of the invention, in which an annular focusing mirror and a rotating mirror are combined. In the embodiment, a case is mainly described, in which a soft X-ray of a very small divergence angle is collected. It should be noted that the invention is also applicable to a hard X-ray.

Generally, X-rays are classified into soft X-rays (from about 0.1 to 2 keV), X-rays (from about 2 to 20 keV), and hard X-rays (from about 20 to 100 keV) according to the energy level. However, the classification differs depending on the field of use. A part of X-rays may be included in soft X-rays, or a part of X-rays may be included in hard X-rays. Further, when X-rays are used in a broad meaning, soft X-rays and hard X-rays may be regarded as a sub class of X-rays. An X-ray in the wavelength range of from 2 to 4 nm used in the invention is a soft X-ray.

FIG. 1 and FIG. 2 illustrate a drawback of a soft X-ray focusing optical system using the rotating ellipsoidal mirror 1. In FIG. 1 and FIG. 2, O indicates an X-ray source, and F indicates a focal point. FIG. 1 illustrates a case, in which a soft X-ray of a very small divergence angle is directly collected by the rotating ellipsoidal mirror 1. In this case, an X-ray is applied only to a part of the reflection surface of the rotating ellipsoidal mirror 1. As a result, it is impossible to sufficiently obtain the performance of the rotating ellipsoidal mirror 1. FIG. 2 illustrates a case, in which a beam is expanded by the upstream mirror 2 having a short focal length, and then is collected by using the entire surface of the rotating ellipsoidal mirror 1. In this case, fundamentally, a beam traveling through the middle portion of the rotating ellipsoidal mirror 1 cannot be used in view of the property of the rotating ellipsoidal mirror 1. As a result, the intensity of usable beam is lowered. Further, it is necessary to use a beam stop in order to block direct incidence of X-ray on the focal plane. This may make the optical system complicated. It can be said that increasing the beam intensity is one of the important factors for enhancing the detection limit or shortening the detection time in the field of analysis. An optical system in which a beam from an X-ray source is applied to the entire surface of a mirror while using all the fluxes is an idealistic optical system.

The invention proposes an X-ray focusing system provided with an improved rotating mirror, which is an idealistic focusing element. FIG. 3 is a schematic diagram of the X-ray focusing system of the invention. The X-ray focusing system of the invention is constituted by two aspherical oblique incident focusing mirrors i.e. a rotating mirror 3 and an annular focusing mirror 4, in which the annular focusing mirror 4 is disposed on the upstream side, and the rotating mirror 3 is disposed on the downstream side. An X-ray 5 outputted from the X-ray source O is expanded in an annular manner by the annular focusing mirror 4, and the expanded X-ray is reflected on the entire surface of the rotating mirror 3 and collected at the focal point F. The X-ray focusing system of the invention is provided with the following three advantages necessary for enhancing the performance of X-ray analysis.

1. Rotating Mirror

Use of a rotating mirror as a focusing mirror is advantageous because the rotating mirror is free of chromatic aberration, has a large aperture, has a long focal length, is small, and is capable of performing nano-focusing.

2. Annular Focusing Mirror

The annular focusing mirror collects an X-ray beam in an annular manner, and then, radially expands the X-ray beam. According to this configuration, there is no beam passing through the middle portion of the rotating mirror, and theoretically, it is possible to attain 100% beam use efficiency.

3. Two-Step Focusing

A beam is collected in an annular manner in the first half stage (a light collecting ring is formed), and then is collected at a focal point in the second half stage. This makes it possible to reduce the geometrical size of a focusing beam from a light source to a value equal to or smaller than the diffraction limit, and makes it possible to achieve focusing to the diffraction limit.

Owing to the aforementioned three advantages, it is possible to configure an X-ray focusing system having "high luminance", "free of chromatic aberration", and capable of "collecting beams to the diffraction limit".

Next, an optical design method for determining the shape of the rotating mirror 3 and the shape of the annular focusing mirror 4 by a complicated geometrical configuration under an optical focusing condition, and determining the mirror layout is described based on FIG. 3 to FIG. 8. The optical design method for an X-ray focusing system using a rotating mirror of the invention employs a very simple technique using a requirement that "all the optical path lengths are required to be the same in a focusing optical system". The design method is described in the order of the rotating mirror 3 and the annular focusing mirror 4.

<Rotating Mirror>

Briefly describing, the profile of the rotating mirror 3 is such that "an ellipse is inclined with respect to a focal point". The shape of the rotating mirror 3 is obtained by rotating the profile by one turn around the optical axis OA. The parameters of an elliptic function a and b can be calculated by the following equation when it is assumed that L is a distance between focal points, $\theta_1$ is a maximum incident angle (an angle defined by a tangential line to an ellipse and an incident X-ray), and f is a working distance.

$$a = \frac{L}{2}\sqrt{\frac{1\sqrt{1-\left(1-\frac{2f}{L}\right)^2 \sin^2 2\theta_1}}{1+\cos 2\theta_1}}$$ [Equation 1]

$$b = \sqrt{a^2 - \frac{L^2}{4}}$$ [Equation 2]

Figure 5:
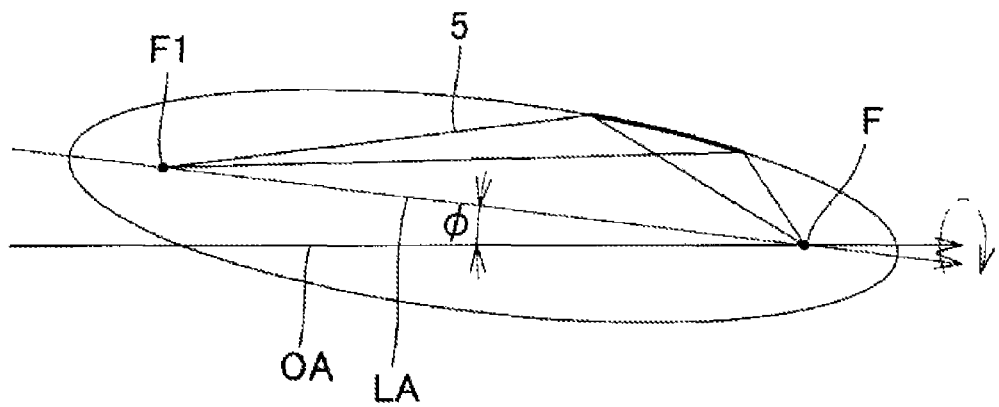
FIG. 5 is an explanatory diagram illustrating a state that the major axis of an ellipse is rotated by the angle $\varphi$ around an optical axis.
Figure 6:
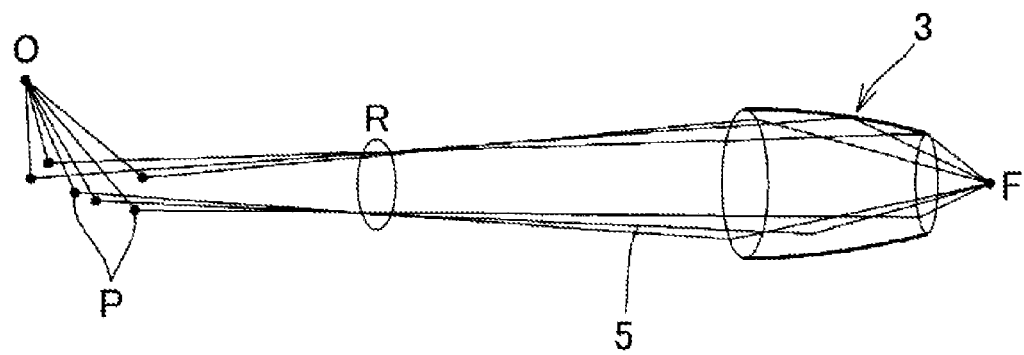
FIG. 6 is an explanatory diagram illustrating a step of determining the shape of an annular focusing mirror after the shape of the rotating mirror is determined.

As illustrated in FIG. 5, the major axis LA of an elliptical shape is rotated by the angle φ around the optical axis OA with respect to the focal point F. A locus of rotation of focal point F1, which is the other of the focal points of the elliptical shape, forms a light collecting ring R. When it is assumed that (X, Y) denotes an elliptical shape before rotation, and (x, y) denotes an elliptical shape obtained by rotating the aforementioned elliptical shape by the angle φ, the following equation is obtained.

$$\begin{pmatrix} x \\ y \end{pmatrix} = \begin{pmatrix} \cos\varphi & \sin\varphi \\ -\sin\varphi & \cos\varphi \end{pmatrix}\begin{pmatrix} X \\ Y \end{pmatrix} \Leftrightarrow \begin{pmatrix} X \\ Y \end{pmatrix} = \begin{pmatrix} \cos\varphi & -\sin\varphi \\ \sin\varphi & \cos\varphi \end{pmatrix}\begin{pmatrix} x \\ y \end{pmatrix} \quad \text{[Equation 3]}$$

The profile of the rotating mirror 3 is obtained by substituting the calculation result in the original elliptical function expressed by the following equation.

$$\frac{X^2}{a^2} + \frac{Y^2}{b^2} = 1 \quad \text{[Equation 4]}$$

Thus, the following equation is obtained.

$$y = \frac{1}{A_0}\Big[-B_1 x - B_0 + \sqrt{(B_1^2 - A_0 C_2)x^2 + (2B_1 B_0 - A_0 C_1)x + B_0^2 - A_0 C_0}\Big] \quad \text{[Equation 5]}$$

$A_0 = a^2\cos^2\varphi + b^2\sin^2\varphi,$ $B_0 = -b^2 f\sin\varphi, \ B_1 = (a^2 - b^2)\sin\varphi\cos\varphi$ $C_0 = b^2(f^2 - a^2), \ C_1 = 2b^2 f\cos\varphi,$ $C_2 = a^2\sin^2\varphi + b^2\cos^2\varphi$ In this way, setting x-axis in the optical axis direction and setting y-axis in the radial direction makes it possible to analytically express the radial profile of the rotating mirror 3. Lastly, the entire length of the rotating mirror 3 is determined. Thus, the actual configuration of the reflection surface of the rotating mirror 3 is determined.

<Annular Focusing Mirror>

Since the rotating mirror 3 is designed as described above, ray tracing is performed in the opposite direction from the focal point F. When inverse ray tracing is performed, a point on a beam which connects "the light source O, the point on the beam, a reflection point on the rotating mirror, and the focal point F" at which the optical path lengths are the same as each other is defined as the coordinate of the annular focusing mirror 4. The aforementioned operation is performed for the entire circumference of the light collecting ring R. A group of coordinates P (inflection points of beams) obtained on the basis of the requirement that the optical path lengths are the same as each other are set as the shape of the reflection surface of the annular focusing mirror 4 (see FIG. 6).

Figure 7:
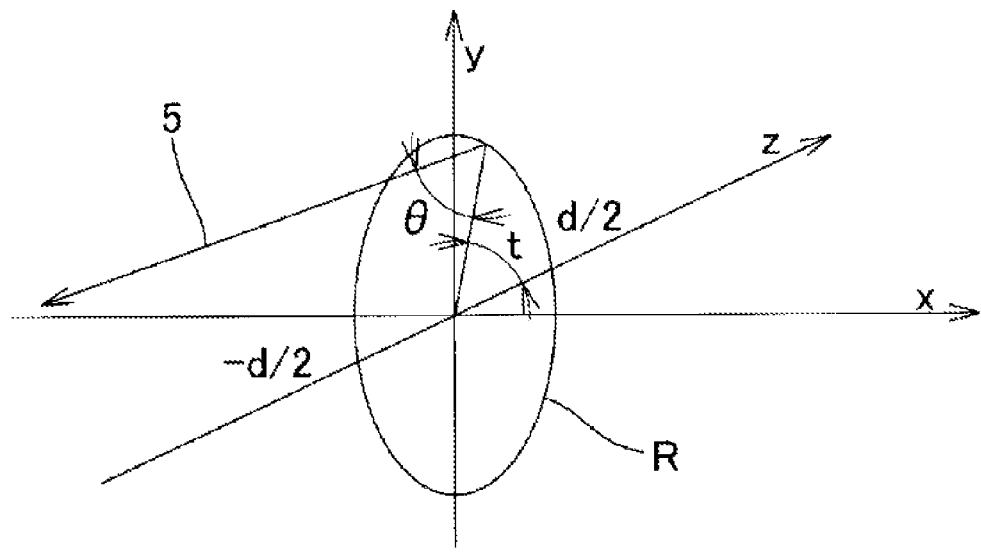
FIG. 7 is an explanatory diagram illustrating a light collecting ring, and parameters for use in determining coordinates of a light beam.

When it is assumed that d is the diameter of the light collecting ring R, as illustrated in FIG. 7, determining the angles t and θ makes it possible to determine the function that expresses a beam by Equation 6 (where p is a parameter, and $x_r$ is the x-coordinate of a light collecting ring). In this example, it is assumed that the optical axis OA is aligned with x-axis, t is the angle of a point on the light collecting ring R located on yz-plane with respect to z-axis, and θ is the angle of the beam 5 passing through the point and intersecting with x-axis with respect to yz plane.

$$\begin{pmatrix} x \\ y \\ z \end{pmatrix} = p\begin{pmatrix} -\sin\theta \\ -\sin t \cdot \cos\theta \\ -\cos t \cdot \cos\theta \end{pmatrix} + \begin{pmatrix} x_r \\ d/2 \cdot \sin t \\ d/2 \cdot \cos t \end{pmatrix} \quad \text{[Equation 6]}$$

It is assumed that $(x_r, y_r, z_r)$ is the coordinate of the light collecting ring R, $(x_s, y_s, z_s)$ is the coordinate of the light source O, and L' is the optical path length from the light source O to the light collecting ring R. Further, in view of a point that the reflection surface of the annular focusing mirror 4 exists on the beam expressed by Equation 6, the following equation is established when it is assumed that (x, y, z) in Equation 6 denotes the coordinate of the reflection surface of the annular focusing mirror 4.

$$(x_r - x)^2 + (y_r - y)^2 + (z_r - z)^2 + (x - x_s)^2 + (y - y_s)^2 + (z - z_s)^2 = L'^2 \quad \text{[Equation 7]}$$

Substituting the aforementioned equation in (x, y, z) in Equation 7, and substituting $y_r = (d/2)\sin t$ and $z_r = (d/2)\cos t$ makes it possible to obtain the value of the parameter p.

$$p(t, \theta) = \frac{L'^2 - \frac{d^2}{4} - (x_s - x_r)^2 - y_s^2 + dy_s \sin t}{2\{L' + (x_s - x_r)\sin\theta + y_s\sin t \cdot \cos\theta - \frac{d}{2}\cos\theta\}} \quad \text{[Equation 8]}$$

Figure 8:
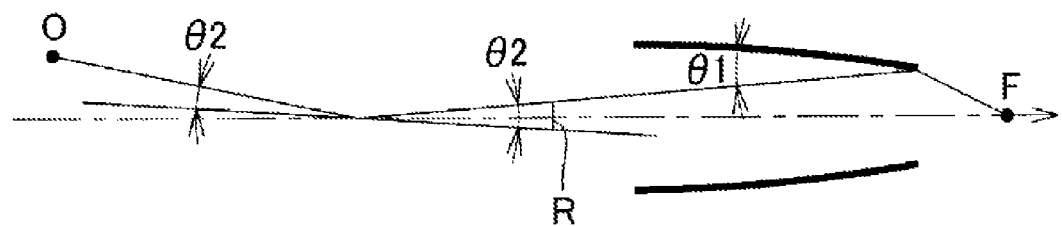
FIG. 8 is an explanatory diagram illustrating a relationship of an incident angle of an X-ray to each of the mirrors.

It is possible to calculate the coordinate $(x_s, y_s, z_s)$ of the light source O by ray tracing, with use of a reference incident angle $\theta_2$ in FIG. 8 and a parameter L'. The reference incident angle $\theta_2$ is the incident angle when it is assumed that the reflection surface of the annular focusing mirror 4 is a flat plane. In FIG. 8, all the beams reflected on the right end of the rotating mirror 3 intersect at one point on the optical axis without depending on the parameters t and θ. Further, the maximum incident angle $\theta_1$ is the angle defined by a tangential line to an ellipse and an incident X-ray. Furthermore, the z-coordinate $z_s$ of the light source O is assumed to be zero because of symmetricity. To summarize the above, it is possible to analytically express the annular focusing mirror 4 by the following Equation 9 with use of the two parameters θ and t. It should be noted that the definition range of θ is determined by the shape of the rotating mirror 3.

$$x = p(t, \theta)\sin\theta + x_r \quad \text{[Equation 9]}$$

$$y = p(t, \theta)\sin t \cdot \cos\theta + \frac{d}{2}\sin t$$

$$z = p(t, \theta)\cos t \cdot \cos\theta + \frac{d}{2}\cos t$$

The optical design method for an X-ray focusing system is configured as described above. Designating the parameters as described above makes it possible to uniquely determine the shape of each of the mirrors. The parameters are determined, taking into consideration the entire length of a beam line, the footprint of the beam, the focusing diameter to be obtained, and the degree of difficulty in processing the reflection surface of a mirror.

It is desirable to use a material having a high reflectance, as a material for the reflection surfaces of the rotating mirror and the annular focusing mirror, whose shapes are determined as described above in accordance with the incident angle. Further, using, as the rotating mirror, a Wolter-type two-reflection mirror in which an ellipse and a hyperbolic curve are combined theoretically makes it possible to reduce the focusing diameter to one-fourth, namely, to about 2 nm. Use of the X-ray mirror makes it possible to attain a focusing diameter as small as near 1 nm.

Specifically, the step of determining the shape of the Wolter-type rotating mirror 3 is a step of determining a reflection surface by rotating the one-dimensional profile by one turn around an optical axis, the one-dimensional profile being obtained by rotating a curve profile composed of an ellipse and a hyperbolic curve by a predetermined angle φ around the optical axis OA passing through the light collecting point O, the curve profile being configured such that one of the focal points of the ellipse and one of the focal points of the hyperbolic curve are made to coincide with each other, and that the other of the focal points of the hyperbolic curve serves as the light collecting point O, the curve profile including a portion at which the ellipse and the hyperbolic curve intersect with each other. In the aforementioned configuration, a locus of the other of the focal points of the ellipse forms the light collecting ring. Making the focal points of the ellipse and the hyperbolic curve to coincide with each other makes it possible to provide the property that the optical path lengths are the same as each other, and that all the reflected beams are collected at the focal point (light collecting point O) of the hyperbolic curve.

EXAMPLES

A mirror configuration designed on the basis of a beam line of about 50 m i.e. a soft X-ray beam line BL17SU of SPring-8 (product of Riken, Physicochemistry III) is described as follows. The positional relationship of mirrors in the X-ray focusing system is such that the distance from the light source O to the center of the annular focusing mirror 4 is 47 m, the distance from the center of the annular focusing mirror 4 to the light collecting ring R is 1.1 m, the distance (distance L between focal points) from the light collecting ring R to the rotating mirror 3 is 6 m, and the distance (focal length f) from the light collecting ring R to the focal point F is 0.02 m. These parameters are described in Table 1, as well as the other parameters. It should be noted that the actual input value of the focal length is set such that the focal length f is set to 20 mm after the ellipse is inclined.

TABLE 1

| Parameter | Value |
| --- | --- |
| Working distance f | 20 mm |
| Distance L between focal points | 6 m |
| Maximum incident angle $\theta_1$ to rotating mirror | 70 mrad |
| Tilt angle φ of ellipse | 0.07 mrad |
| Entire length of rotating mirror | 40 mm |
| Distance L' from light collecting ring to light source | 48 m |
| Reference incident angle $\theta_2$ to annular focusing mirror | 10 mrad |

Figure 9:
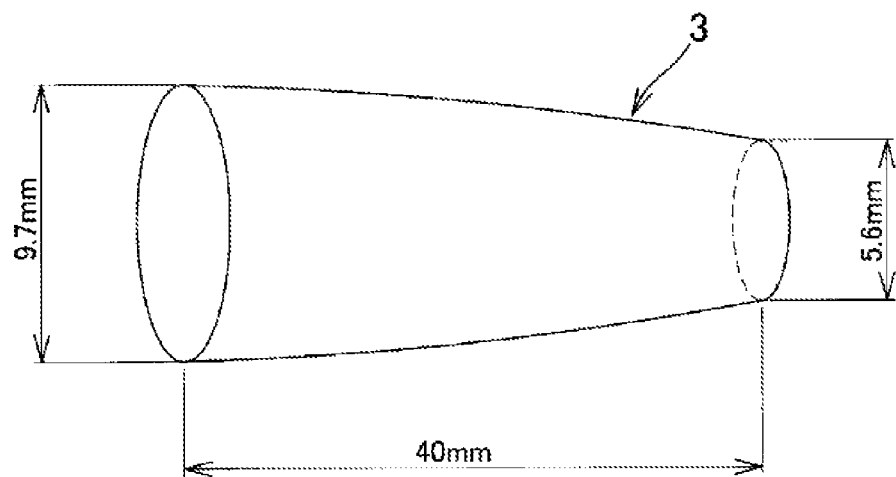
FIG. 9 is a perspective view illustrating an example of a rotating mirror determined by an optical design method of the invention.
Figure 10:
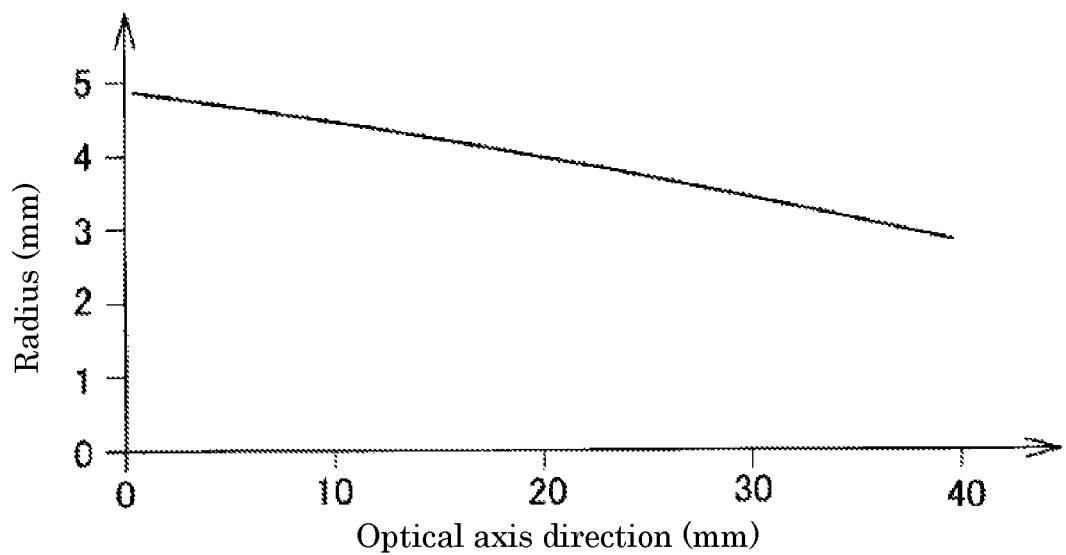
FIG. 10 is a graph illustrating a radial profile of the rotating mirror with respect to the optical axis direction.

FIG. 9 and FIG. 10 illustrate a shape of the rotating mirror and a radial profile of the rotating mirror in the optical axis direction. As illustrated in FIG. 9, the shape of the rotating mirror has an elongated tubular structure, in which the length is 40 mm, the diameter of a large diameter portion is 9.7 mm, and the diameter of a small diameter portion is 5.6 mm.

Figure 11:
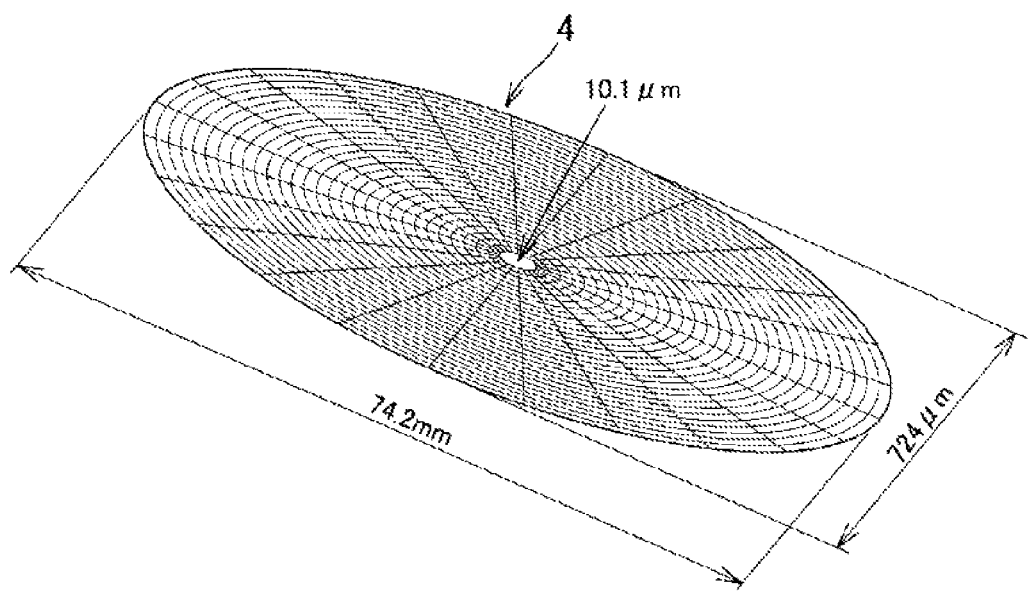
FIG. 11 is a perspective view illustrating an example of an annular focusing mirror determined by the optical design method of the invention.
Figure 12:
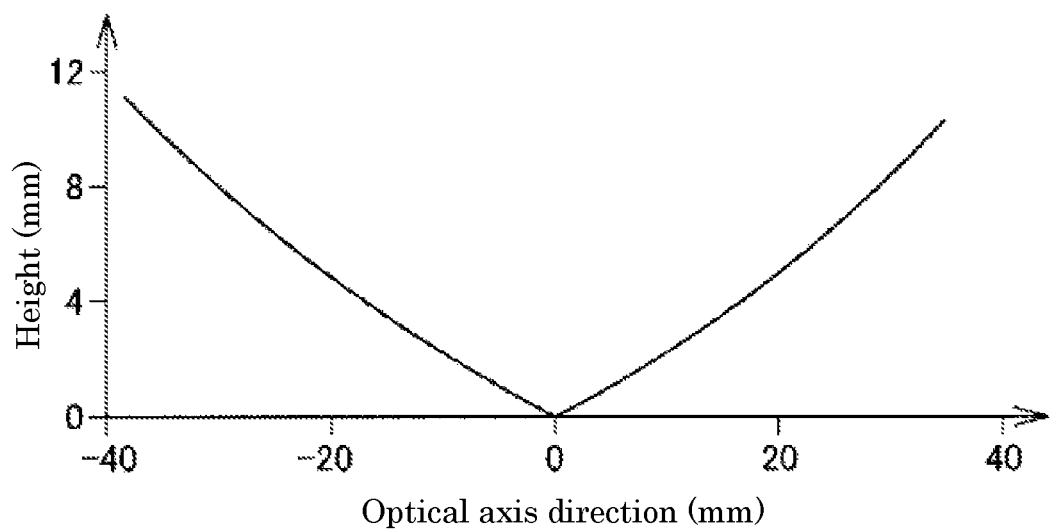
FIG. 12 is a graph illustrating a sectional profile of the annular focusing mirror in the optical axis direction.

FIG. 11 and FIG. 12 illustrate a shape of the annular focusing mirror and a profile of the annular focusing mirror in the optical axis direction. As illustrated in FIG. 11, the annular focusing mirror is elongated and has a substantially flat shape. As is clear from the graph of FIG. 12 illustrating the profile of the annular focusing mirror, the annular focusing mirror has a singular point on the middle portion of the mirror. The reflection surface of the annular focusing mirror is such that the length in the optical axis direction is 74.2 mm, the lateral width is 724 μm (0.724 mm), and the depth at the singular point on the middle portion is 10.1 μm. Thus, the reflection surface has a substantially elongated linear shape. This reveals that the divergence angle of an X-ray from the X-ray source O is very small.

The maximum incident angle to each of the mirrors is also a sufficiently large incident angle for reflecting a soft X-ray. When a hard X-ray is used, the maximum incident angle to each of the mirrors is set to a smaller angle.

Lastly, the X-ray focusing system was evaluated by optical simulation on the basis of the shapes and coordinates of the mirrors designed by the aforementioned optical design method. In the invention, only the condition that the optical path lengths are the same as each other is considered as the required condition for the X-ray focusing system, and the reflection direction of light is not considered. In view of the above, ray tracing was performed in order to verify the appropriateness of the X-ray focusing system.

Figure 13:
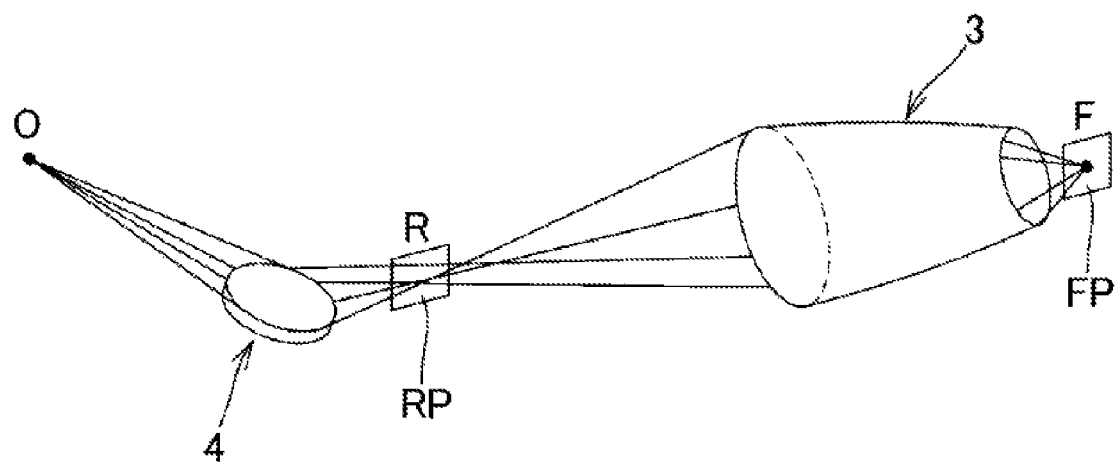
FIG. 13 is an explanatory diagram for use in evaluating the X-ray focusing system of the invention by optical simulation.
Figure 14:
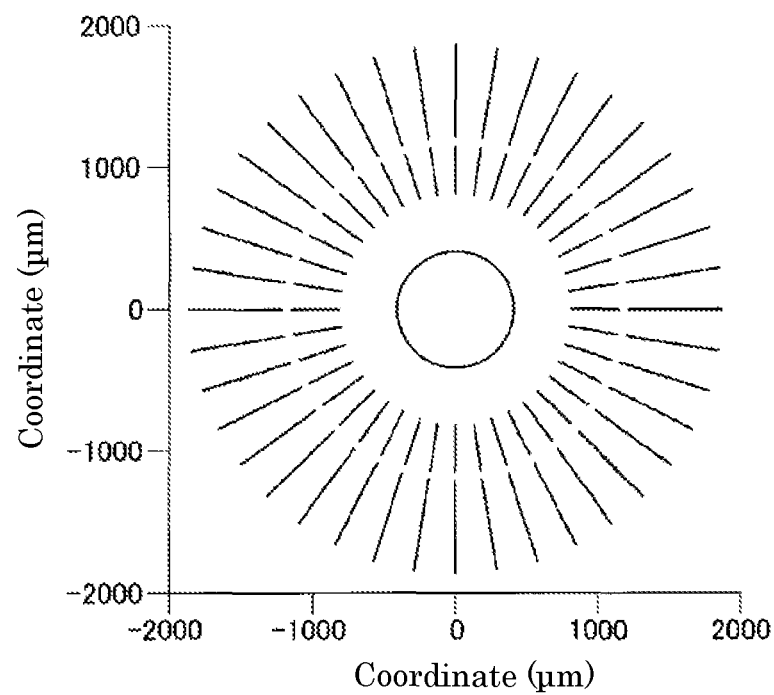
FIG. 14 is a graph illustrating a beam distribution on an annular focusing plane obtained by ray tracing, and beam distributions at positions downstream away from the annular focusing plane by 1 m and 2 m.
Figure 15:
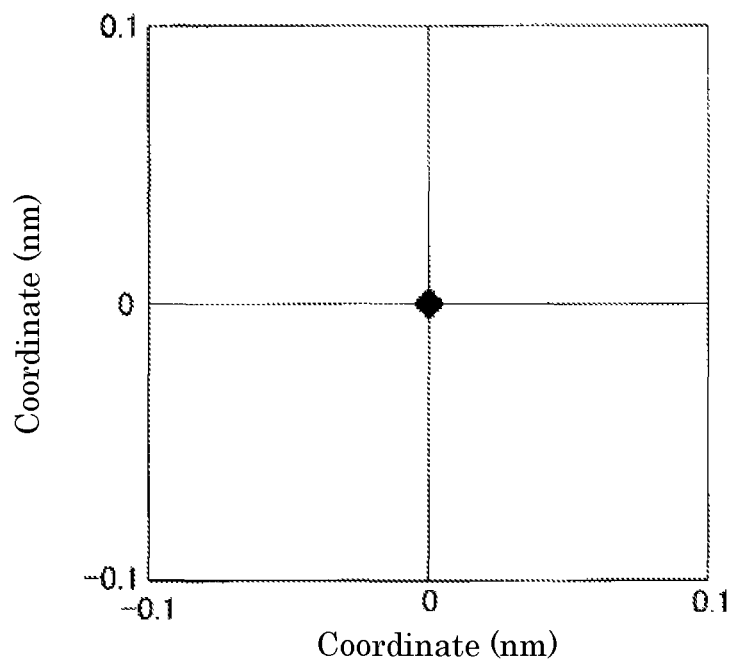
FIG. 15 is a graph illustrating a beam distribution on a focal plane.

The beam distribution on an annular focusing plane RP illustrated in FIG. 13 corresponds to the annular distribution on the center portion illustrated in FIG. 14. It is clear that beams are collected in an annular manner. Further, FIG. 14 also illustrates beam distributions on the planes downstream from the annular focusing plane RP by 1 m and 2 m. These results exhibit that the inner radial beams in FIG. 14 correspond to the beam distribution on the plane away from the annular focusing plane RP by 1 m, and the outer radial beams in FIG. 14 correspond to the beam distribution on the plane away from the annular focusing plane RP by 2 m. Thus, it is clear that beams collected in an annular manner spread radially, and there is no beam in the center or in the vicinity of the center of the rotating mirror. Further, FIG. 15 illustrates a beam distribution on the focal plane FP. It is clear that all the beams are collected at one point (focal point) on the focal plane FP.

Figure 16:
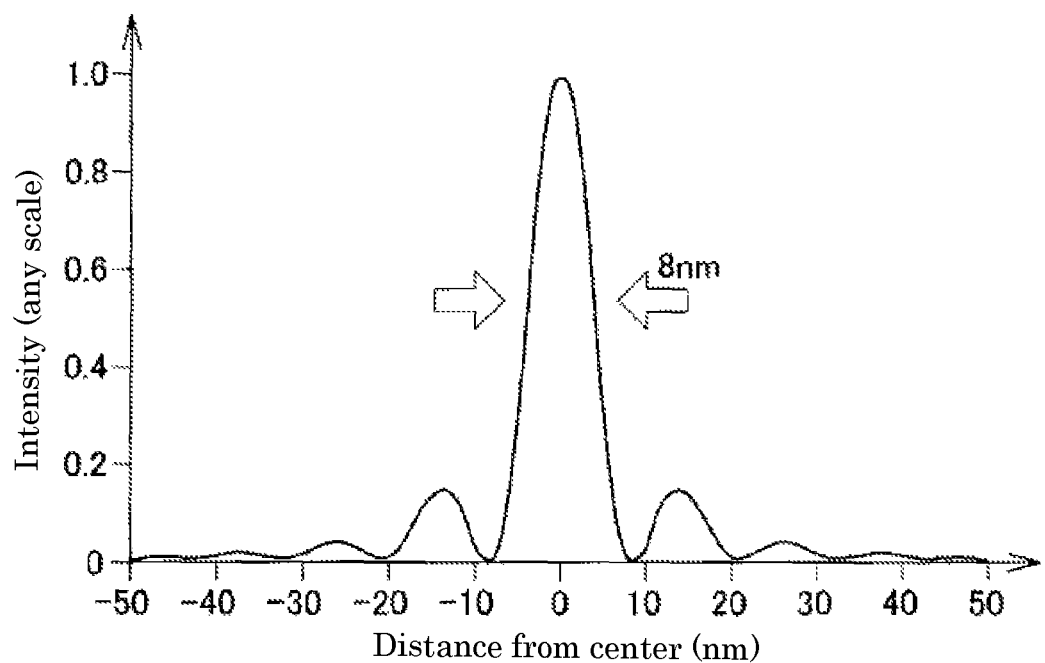
FIG. 16 is a graph illustrating a two-dimensional focusing profile obtained by wave optics simulation.

Next, FIG. 16 illustrates a wave optical simulation result. It is clear from the result that it is possible to collect a soft X-ray of 2.4 nm-wavelength on a spot of 8-nm diameter (FWHM) in terms of wave optics. Further, it is clear that a high quality spot whose sub peak is small is obtained.

By the aforementioned two optical simulations, it is clear that the X-ray focusing system of the invention functions as an X-ray focusing optical system in terms of geometry and in terms of wave optics. Geometrically, simulation was performed without performing approximation. Thus, it is clear that all the beams are completely collected without aberration. In terms of wave optics, the focusing diameter substantially coincides with the theoretical value of diffraction limit. These simulation results verify that the design theory of the invention is appropriate, and also verify that it is possible to configure an X-ray focusing optical system having high luminance, free of chromatic aberration, and capable of collecting beams to the diffraction limit.

INDUSTRIAL APPLICABILITY

The significance of radiated light and X-rays is increasing in order to enhance the analysis precision and to create a novel science. The X-ray focusing system of the invention is applicable to next-generation radiation light sources such as an X-ray free electron laser (XFEL). XFEL is capable of outputting fully coherent beam of a small divergence angle. The X-ray focusing system of the invention is suitable for collecting beams. Combining XFEL and the X-ray focusing system of the invention makes it possible to obtain nanobeams of enhanced luminance, as compared with the conventional art.

Enhancement of various X-ray applied analyses can be expected by using nanobeams of high luminance. For instance, when a beam is applied to a sample, data having a large S/N ratio can be obtained. Therefore, it is possible to analyze the structure of a protein that is not crystallized. Thus, shortening the pharmaceutical development process can be expected. Further, it is also possible to apply the technique in observing cells on a real-time basis with high resolution by utilizing the characteristics that nanobeams have an ultra-short pulse. Further, in view of a point that a light collecting point does not rely on the wavelength, it is possible to efficiently perform an experiment, while changing the wavelength for an X-ray absorption fine structure (XAFS).

REFERENCE SIGNS LIST

1 Rotating ellipsoidal mirror
2 Upstream mirror
3 Rotating mirror
4 Annular focusing mirror
5 Beam (X-ray)
O Light source (X-ray source)
F Focal point (light collecting point)
R Light collecting ring
OA Optical axis
LA Major axis
f Focal length
L distance between focal points

The invention claimed is:

1. An optical design method for an X-ray focusing system using a rotating mirror, comprising:
a step of determining a shape of a rotating mirror provided with a reflection surface, the reflection surface being formed by rotating, by one turn around an optical axis, a one-dimensional profile composed of an ellipse or a part of combination of the ellipse and a hyperbolic curve, the ellipse including a downstream focal point serving as a light collecting point of the X-ray focusing system, and including an upstream focal point deviated from the optical axis; and
a step of determining a shape of a reflection surface of an annular focusing mirror as a group of coordinates of inflection points of beams in inverse ray tracing, the annular focusing mirror having a function of reflecting and expanding an X-ray beam outputted from an X-ray source and collecting the X-ray beam on a light collecting ring under a constrained condition such that the X-ray beam passes through the light collecting ring formed by a locus of the upstream focal point, and that optical path lengths are the same as each other as a result of inverse ray tracing from the light collecting point to the X-ray source.

2. The optical design method for an X-ray focusing system using a rotating mirror according to claim 1, further comprising:
a step of determining the shape of the rotating mirror provided with a reflection surface, the reflection surface being formed by rotating, by one turn around an optical axis, a one-dimensional profile composed of a part of an ellipse, the ellipse being configured such that one of focal points of the ellipse serves as the light collecting point of the X-ray focusing system, and that a major axis of the ellipse is rotated by a predetermined angle around an optical axis passing through the light collecting point, wherein
a locus of the other of the focal points of the ellipse forms the light collecting ring.

3. The optical design method for an X-ray focusing system using a rotating mirror according to claim 1, further comprising:
a step of determining the shape of the rotating mirror provided with a reflection surface, the reflection surface being formed by rotating the one-dimensional profile by one turn around an optical axis, the one-dimensional profile being formed by rotating a curve profile composed of an ellipse and a hyperbolic curve by a predetermined angle around an optical axis passing through the light collecting point, the curve profile being configured such that one of focal points of the ellipse and one of focal points of the hyperbolic curve are made to coincide with each other, and that the other of the focal points of the hyperbolic curve serves as the light collecting point, the curve profile including a portion at which the ellipse and the hyperbolic curve intersect with each other, wherein
a locus of the other of the focal points of the ellipse forms the light collecting ring.

4. An X-ray focusing system using a rotating mirror, comprising:
a rotating mirror constituting an oblique incident optical system; and
an annular focusing mirror, wherein
an X-ray beam outputted from an X-ray source is expanded by the annular focusing mirror and collected in an annular manner,
the X-ray beam is reflected on an entire surface of an elliptical portion of the rotating mirror, and
all fluxes of the X-ray beam are collected at a light collecting point, the rotating mirror having an elliptical shape or a shape obtained by combining an ellipse and a hyperbolic curve, and the rotating mirror being configured such that a radial profile of a reflection surface in an optical axis direction has, as two focal points, a point on the light collecting ring formed by collecting the X-ray beam on the annular focusing mirror, and a light collecting point of the system.

5. The X-ray focusing system using a rotating mirror according to claim 4, wherein
the annular focusing mirror is an aspherical mirror including a singular point on a center portion corresponding to an optical axis of the X-ray beam outputted from the X-ray source.

* * * * *